United States Patent
Trott

[15] 3,665,379
[45] May 23, 1972

[54] PULSE-SOUND TRANSMITTING TUBE FOR CALIBRATING UNDERWATER SOUND TRANSDUCERS

[72] Inventor: Winfield James Trott, 7053 Wardell Street, Annandale, Va. 20030

[22] Filed: Sept. 25, 1969

[21] Appl. No.: 861,087

[52] U.S. Cl. ..........................340/5 C, 73/1 DV, 181/0.5 AP, 340/8 FT
[51] Int. Cl. ..............................................G01s 9/66
[58] Field of Search .....................340/5 C, 8 FT; 181/0.5 AP; 73/1 DV

[56] References Cited

UNITED STATES PATENTS

| | | | |
|---|---|---|---|
| 2,394,461 | 2/1946 | Mason | 181/0.5 AP |
| 2,490,452 | 12/1949 | Mason | 73/1 DV |
| 3,121,211 | 2/1964 | Eskin et al. | 340/8 |

Primary Examiner—Richard A. Farley
Attorney—A. L. Banning, M. L. Crane and R. S. Sciascia

[57] ABSTRACT

A method and apparatus for calibrating sound transducers wherein the transducer to be calibrated is mounted so as to radiate sound into a water filled, thick walled, metal tube sealed at the transducer end by a rubber diaphragm and at the other end by a metal reflector that approximates a quarter wave in length. The water sealed in the tube is preferably deaerated to prevent formation of air bubbles that would affect acoustic transmission and means are provided to transmit pulses of sound from the transducer to the reflector from which they are reflected back to the transducer. The sensitivity of the transducer in terms of open circuit voltage per unit of sound pressure as a function of frequency can be simply ascertained by driving the transducer with a constant current over the frequency range of interest and recording the resultant sensitivity versus frequency in decibels with a 1 volt/microbar reference. Other characteristics of the transducer, including impedance, can be ascertained by adding an absorber in front of the reflector.

13 Claims, 2 Drawing Figures

Patented May 23, 1972

INVENTOR
WINFIELD JAMES TROTT

BY
Cushman, Darby & Cushman
ATTORNEYS

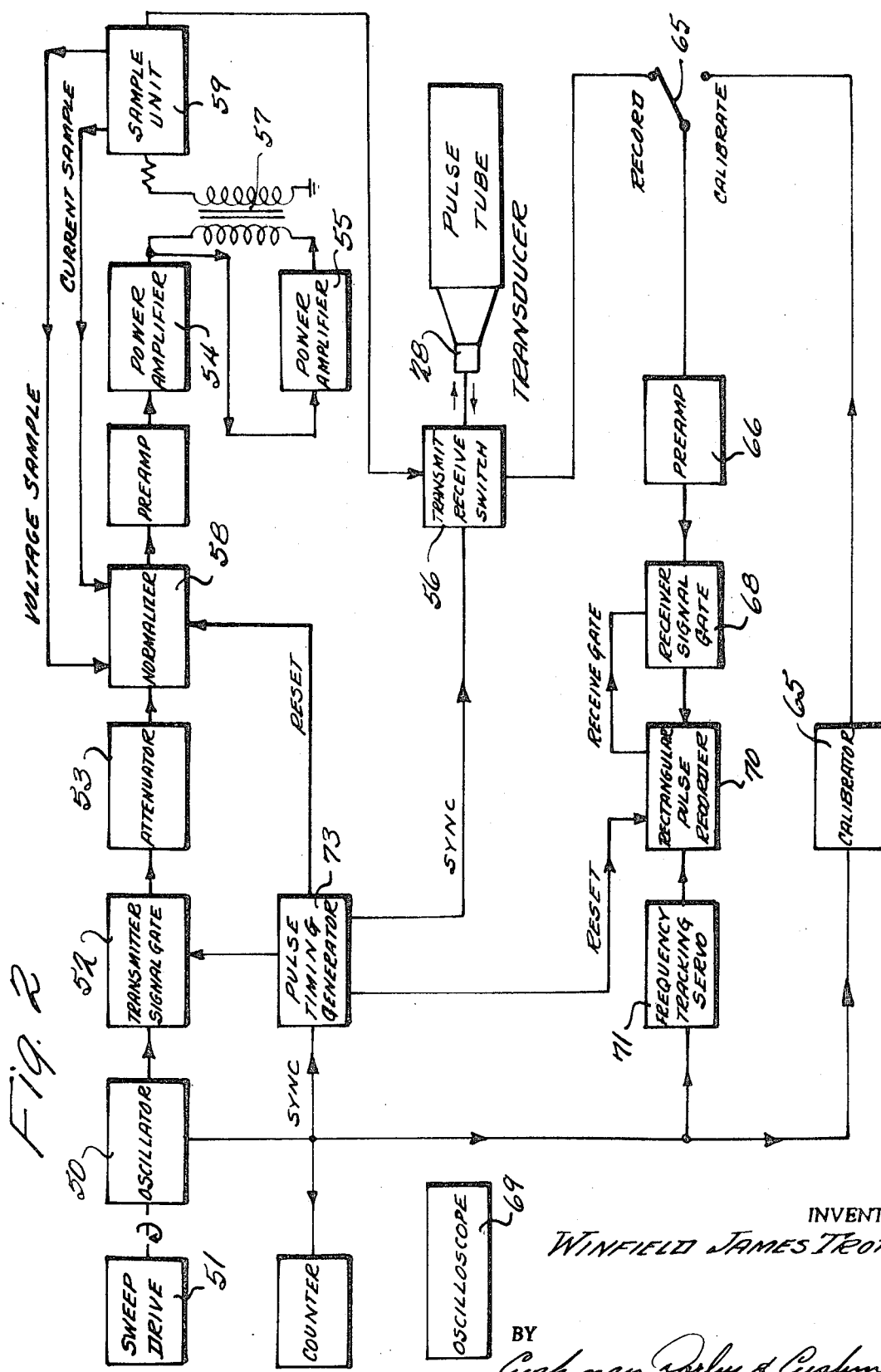

PULSE-SOUND TRANSMITTING TUBE FOR CALIBRATING UNDERWATER SOUND TRANSDUCERS

BRIEF DESCRIPTION OF THE PRIOR ART AND SUMMARY OF THE INVENTION

The invention relates to a method and apparatus for calibrating underwater sound transducers.

In the production, maintenance and repair of some underwater transducers, there is a need for a rapid means of evaluating the transducer elements for quality control and calibration. Current methods in use are time consuming and limited by test environments. Particularly, full power measurements are limited by the cavitation level in the water which is a function of the condition of the water, the temperature and the test depth. Shipyard sonar repair facilities, as well as other locations wherein transducer elements must be frequently calibrated, now usually evaluate sonar elements by a brief operation in an open water tank or bay with little or no control over the condition of the water, so that there is no opportunity for testing the elements at a reasonable overload level or under operating acoustic load conditions to check for incipient defects.

The present invention relates to a method and apparatus for detecting actual and incipient defects in sonar and other transducers during production, prior to disassembly of faulty sonar transducers, and after repair and reassembly, under conditions that will permit data comparison throughout the production, maintenance and repair operations. The measurements which can be made with this arrangement include sensitivity, impedance at high power and the overload level which results from mechanical or electrical breakdown. It is advantageous to be able to vary the acoustic load and hydrostatic pressure in order to locate some types of defects and this can be accomplished easily with the apparatus described below.

In the embodiment described below, a water filled tube, terminated by a reflector, provides a controlled acoustic load for measuring sensitivity, and other useful transducer characteristics. A sound absorber can be inserted in front of the reflector for measuring other characteristics, including impedance. Overload can be analyzed by testing for linearity and electrical breakdown.

For example, to determine the sensitivity of a transducer disposed so as to radiate sound into the metal tube in terms of open circuit voltage per unit of sound pressure as a function of frequency, the transducer is driven by a constant current over the frequency range of interest, and the receiving sensitivity recorded in decibels with a reference of one volt per microbar versus frequency. This record then gives a direct indication of the sensitivity of the device. Further, with this simple and easy method calibration, transducers can be quickly and economically checked for quality control in situations where a large number of transducers must be examined. Further, measurements can be easily made at temperatures and hydrostatic pressures other than ambient to discover other defects.

Many other objects and purposes of the invention will become clear from the following detailed description of the drawing.

BRIEF DESCRIPTION OF THE DRAWING

FIG. 2 shows a schematic diagram of the electrical circuitry for operating the tube in FIG. 1.

DETAILED DESCRIPTION OF THE DRAWING

Figure 1:
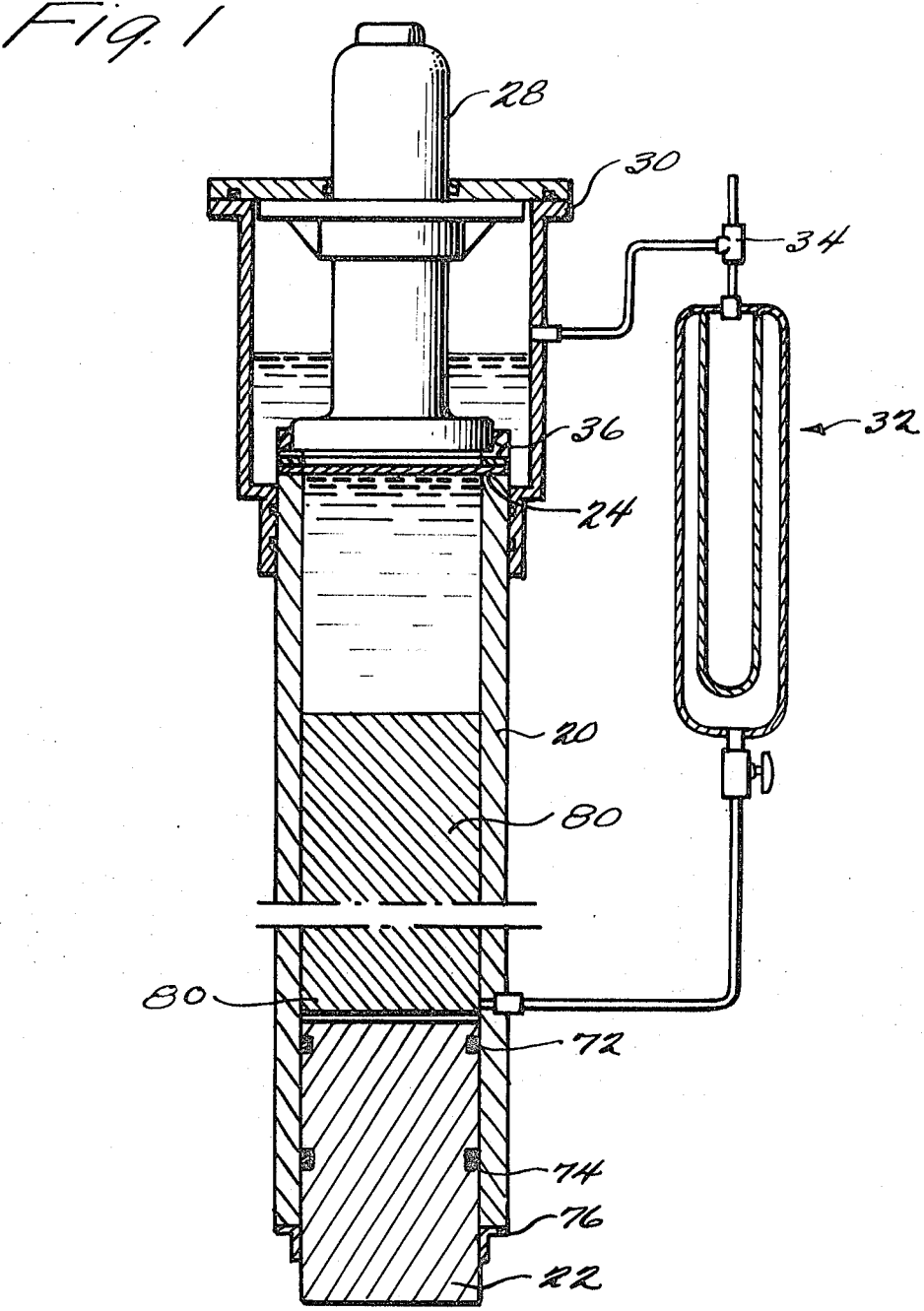
FIG. 1 shows the test tube of this apparatus for calibrating and testing transducers.

Reference is now made to FIG. 1 which shows an arrangement for evaluating transducer elements particularly for quality control, and calibrating them for sensitivity and a number of other indicators of quality. In this arrangement, a water filled, thick walled tube 20 is closed at its lower end by a reflector 22 and at its upper end by a rubber diaphragm or "window" 24. The transducer 28 which is being tested and which is intended to be typical of conventional transducers now in use is mounted above and in contact with the rubber diaphragm 24 as shown so as to be coupled to the water in tube 20 both to impart acoustical energy to the water within the thick walled tube 20 and to receive energy from the water. A coupler 30 holds the transducer 28 in place and permits variation of the acoustic load and changes in the hydrostatic pressure from ambient. A conventional accumulator 32 is further connected through a conventional reducing valve 34 to an air pressure line, such as the factor air pressure line, so that the hydrostatic pressure can be equalized on the water in the tube 20 and the air in the top portion of the coupler 30 as shown. A tight fitting ring 36 around transducer 28 further isolates any acoustic transmitted signals from the air-water surface of the coupler 30.

As mentioned briefly above, the tube 20, which will normally be about 7 feet long, and thus about 5 wave lengths at frequencies of interest, has a wall sufficiently thick so that the wall transmission of the acoustical signals to the reflector 22 is very small compared to the water born sound. Further, the water within the tube 20 is preferably deaerated to prevent formation of air bubbles which affect acoustic transmission and accordingly distort results.

The transducer 28 under test can be driven to conventionally produce acoustical vibrations which are then imparted to the water in tube 20 by a variable frequency oscillator 50 which is shifted through the frequency range of interest by a sweep drive 51 as shown in FIG. 2. The signals from oscillator 50 pass to the transducer 28 via a transmitting signal gate 52, an attenuator 53, power amplifiers 54 and 55, a transformer 57 and a transmit-receive switch 56, which may be a reed switch. The normalizer unit 58 insures that a constant current is supplied to the switch 56 over the frequency of interest and the output of transformer 57 is conveyed back to normalizer 58 by sampler 59. The transmit-receive switch 56 operates only when the signal gate 52 is open and is used to switch the transducer 28 from the drive circuit to the receive circuit. The pulse generator 73 periodically opens gate 52 to drive the transducer and then closes gate 52 and shifts switch 56 to receive the signal back from reflector 22.

As mentioned briefly above, the unique device described herein is capable of quickly and simply determining a number of important characteristics of the transducer including impedance, sensitivity, efficiency and linearity, with power, pulse length and duty cycle. The sensitivity of the transducer in terms of open-circuit voltage per unit of sound pressure as a function of frequency is particularly important and can be determined as follows.

Connecting the oscillator 50 to the transducer 28 produces an acoustical signal which is propagated down the tube 20, principally in the plane wave mode. In one embodiment of the invention with a 5-inch internal diameter, ¾-inch thick steel tube 20, the velocity of sound in the tube was calculated to be 96 percent of the free-field sound velocity. It has been calculated that in such a tube the cut-off for continuous plane wave propagation is roughly 6.5 kHz, but since propagation and pulse shape remain unaffected somewhat above this cut-off in pulse propagation, calibration up to 8 kHz. has been shown practical.

The pulse wave then propagates through the tube to the reflector 22, which in one embodiment was a piece of solid steel 8 inches long and hence a one-fourth wave length at 6.15 kHz so that it is substantially a perfect reflector from 3 to 9.2 kHz. This reflector is preferably supported on two O rings 72 and 74 as shown and held firmly in place by a rubber lined ring clamp 76. The impedance of the slit around the reflector 22 has been calculated to be greater than $1.8 \times 10^5$ dynes sec/cm$^5$ which is well over 100 times the wave impedance in the water.

The acoustic signal which subsequently returns to the transducer 28 from the reflector 22 is then received and shunted by the receive switch 56, which is shifted after the pulse is imparted to the water in tube 20, so as to route the received signals through a switch 65, a preamplifier 66 and a receiver signal gate 68 to a pulse recorder 70. This pulse recorder 70 has also received and recorded the output of the oscillator 50 via a tracking servo 71 as well as the timing pulses from the timing generator 73, so that the electrical representation of the signal imparted to the tube as well as the signal received back from the tube are both noted on the recorder 70. The equipment can be calibrated by shifting the switch 65 to connect calibrator 67 to preamplifier 60. The oscilloscope 69 can be used to visually detect wave and pulse distortion.

The sensitivity of the transducer in terms of open circuit voltage per unit of sound pressure as a function of frequency can now be easily ascertained from the recordings made on the recorder 70 over the frequency range of interest. It has been shown that the sensitivity M of a transducer is equal to $[(E/I) (2A/\rho c)]1/2$ volt microbar, or, for the tube shown in FIG. 1, $M = \frac{1}{2} \text{\textcircled{E}} - \text{\textcircled{I}} - 194.9$) dB re 1 volt/microbar, where $E$ equals the received open circuit voltage, in dB $I$ is the non-variant driving current in dB, $A$ is the cross-sectional area of the water transmission line and $\rho c$ is the wave impedance in the tube.

The transmitting current response $S$ of the transducer can further be easily obtained from the relation $S = M/J$ where $J$ is the spherical wave reciprocity parameter and equals $2d \lambda/\rho c$ where $d$ is the distance reference for the specified transmitting current response, $\lambda$ is the wavelength of sound and $\rho c$ is the wave impedance.

Test performed on typical transducer elements at a low power over a frequency range of 3.5 to 8 kHz showed a variation in the free-field voltage sensitivity at the first resonance between −69.4 and −70.7 dB re 1V/microbar for a spread of 1.3 dB with a specified accuracy of ± 0.6 dB. Other tests showed a spread of 0.6 dB. These results correspond closely with data obtained using other more complex methods.

In addition to receiving sensitivity and transmitting response, source level, efficiency, electrical polarity and relative phase difference in the electroacoustic transfer function of the transducer can be determined from the signals on recorder 70. In particular, the measure of efficiency in a tube was described in an article by G. A. Saban which appeared in the Journal of the Acoustical Society of America, Volume 40, p. 1345 (1966) and this disclosure is explicitly incorporated herein by reference. Further, the test for polarity will normally require insertion of a probe hydrophone into the acoustical path. Measuring the relative phase difference is also useful because it is believed that small variations therein have a substantial effect upon the directivity and bearing accuracy of the assembled transducer. This phase variation will normally appear to be a change in the length from the transducer to the reflector.

The transducer can further be tested as a function of power in order to determine the overload level, which may be due to non-linearity in the mechanical or electrical part of the transducer, overheating or arcing. Linearity can be measured by varying the impedance in the receiving circuits for a constant input sound pressure. Other diagnostic tests can be devised employing variation of the acoustical load, hydrostatic pressure and pulse length.

For making impedance measurements under conditions that simulate normal acoustic radiation loads, active impedance tube techniques have proven too complex for economical production testing. However, an acoustic absorber have been found quite satisfactory for performing such testing and the arrangement shown in FIG. 1 can be so modified by simply placing a sound absorber 80, preferably matching in impedance the $\rho c$ impedance of the water, in front of the reflector 22 as shown. The choice of sound absorber used depends upon the attenuation being independent of frequency over the range of interest and the thermal conductivity required to stabilize temperature for high power acoustical measurements at sonar operating pulse duration and repetition rates.

The accumulator 32 or some other means for increasing the hydrostatic pressure within the tube 20 may be desired for simulating the sonar depth under a ship and to increase pressure for overload voltage breakdown tests. If desired a radio frequency, radiation detector can be employed to detect the onset of Corona breakdown. Increasing the hydrostatic pressure can be used to detect the point of cavitation if it occurs at one of the interfaces between the transducer and the acoustic radiating surface of the transducer. This point could be detected simply by observing changes in the signal wave form. Increasing the hydrostatic pressure above the normal sonar operating condition also enables the transducer to be driven above the normal operating power level to detect incipient defects that may cause premature degradation in sonar operation. If necessary, cooling water can be circulated about tube 20 and thermostatically controlled to maintain the temperature within a desired range. A more viscous liquid such as castor oil can be used in tube 20 in place of water in order to enhance sound absorption.

It is believed that the radiation load seen by an element radiating into such an absorber tube is much closer to the actual impedance during normal operation than an element radiating into free space. In addition, the absorber isolates the transducer from any effects due to undriven, faulty surrounding elements.

As pointed out briefly above, this novel device permits easy variation of the hydrostatic pressure. As should be apparent this permits additional testing and the detection of many undesirable conditions not otherwise apparent.

Many changes and modifications of the arrangement shown in FIGS. 1 and 2 can be made without departing from the scope of the invention. For example, means can be provided for positioning an absorber automatically in front of the reflector and then removing it. The assembly can be mounted vertically or can be inclined at an angle to the vertical. The acoustic load on the transducer can be varied either with an active piezoceramic ring between the transducer and the tube or by lengthening the pulse to produce standing waves. The reflector would then have to be moved after each frequency test to keep the length of the tube in one-half wave lengths.

Accordingly this novel acoustical transducer testing device has been shown capable of quickly, simply and inexpensively calibrating and testing transducers, and especially ascertaining the sensitivity of the transducer over a frequency range.

What is claimed is:

1. An apparatus for testing an underwater sound transducer which comprises:
    an elongated metal container having first and second axially aligned open ends, with a wall thickness such that sound transmitted through said wall is small compared to sound transmitted through a sound wave transmitting solution confined within said container,
    a flexible diaphragm secured over and enclosing said first open end of said container for coupling a sound transducer positioned outwardly of said container with said sound wave transmitting solution in said container,
    a sound wave reflecting member having a length of approximately one-fourth wavelength secured within said second open end of said container for confining said sound wave transmitting solution within said container between said sound wave reflecting member and said diaphragm and for reflecting incident sound waves back toward a transducer coupled through said flexible diaphragm to said sound wave transmitting solution in said container, and
    means for securing the transmit/receive end of a transducer in physical contact with said flexible diaphragm for testing of the transducer.

2. An apparatus as claimed in claim 1; wherein, said flexible diaphragm is formed of rubber.

3. Apparatus as claimed in claim 1; wherein, said sound wave transmitting solution in said container is deaerated water.

4. An apparatus as claimed in claim 1; which comprises, an acoustic signal isolation ring associated with said flexible diaphragm for fitting around the transmit/receive end of said transducer during testing.

5. An apparatus as claimed in claim 1; which includes, a sound absorber means secured within said container juxtaposed said sound wave reflecting member.

6. Apparatus as in claim 1 wherein said reflector is a metallic member.

7. Apparatus as in claim 1 including means for varying the hydrostatic pressure within said container.

8. Apparatus as in claim 7 wherein said varying means includes an accumulator.

9. Apparatus as in claim 1 including means for driving said transducer so that said transducer imparts sound to the sound wave transmitting solution in said container and means for recording the response of said transducer to the sound reflected to said transducer from said reflecting means.

10. Apparatus as in claim 9 wherein said driving means includes a variable frequency oscillator and means to maintain the input to said transducer at a constant current level.

11. Apparatus as in claim 10 wherein said driving means includes switch means having a first position for connecting said transducer to said oscillator and a second position for connecting said transducer to said recording means.

12. An apparatus as in claim 1 wherein said container is a cylindrical tube.

13. Apparatus as in claim 5 further including means for measuring the impedance of said transducer while imparting sound to said transducer.

* * * * *